(12) United States Patent
Ip et al.

(10) Patent No.: US 11,783,506 B2
(45) Date of Patent: Oct. 10, 2023

(54) METHOD AND DEVICE FOR DETECTING A TRAILER ANGLE

(71) Applicant: Continental Automotive Systems, Inc., Auburn Hills, MI (US)

(72) Inventors: Julien Ip, Madison Heights, MI (US); Kyle Patrick Carpenter, Clarkston, MI (US); Xin Yu, Rochester Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 0 days.

(21) Appl. No.: 17/247,754

(22) Filed: Dec. 22, 2020

(65) Prior Publication Data

US 2022/0198702 A1     Jun. 23, 2022

(51) Int. Cl.
*G06T 7/73*     (2017.01)
*G06V 20/56*     (2022.01)

(52) U.S. Cl.
CPC ........... *G06T 7/74* (2017.01); *G06V 20/56* (2022.01); *G06T 2207/30252* (2013.01)

(58) Field of Classification Search
CPC ....... G06T 3/0068; G06T 3/0075; G06T 7/30; G06T 7/38; G06T 7/50; G06T 7/521; G06T 7/73; G06T 7/74; G06T 7/80; G06T 7/97; G06T 2207/30248; G06T 2207/30252; G06K 9/00; G06V 20/56; G06V 20/58; G06V 20/582; G06V 20/584; G06V 20/586; G06V 20/588; G06V 2201/08; G05D 1/0234; G05D 1/0246; G05D 1/0253
See application file for complete search history.

(56) References Cited

U.S. PATENT DOCUMENTS

| | | | |
|---|---|---|---|
| 2011/0170767 A1* | 7/2011 | Lemonde et al. ..... | G01B 11/25 382/154 |
| 2011/0249864 A1* | 10/2011 | Venkatesan et al. ........ | G01B 11/2509 382/103 |
| 2012/0265416 A1* | 10/2012 | Lu et al. ............ | H04N 5/23293 348/148 |
| 2015/0217693 A1* | 8/2015 | Pliefke et al. ......... | H04N 7/183 348/118 |
| 2016/0152263 A1* | 6/2016 | Singh et al. ....... | G01C 21/3407 701/41 |
| 2016/0378117 A1* | 12/2016 | Szatmary et al. ...... | G01S 17/89 382/153 |
| 2018/0040129 A1* | 2/2018 | Dotzler ................... | B60R 11/04 |
| 2018/0276838 A1* | 9/2018 | Gupta et al. ............. | G06T 7/70 |
| 2018/0319438 A1* | 11/2018 | Herzog ................. | G06N 20/00 |

(Continued)

FOREIGN PATENT DOCUMENTS

| | | |
|---|---|---|
| DE | 102019106275 A1 | 9/2020 |
| EP | 1593552 A1 | 11/2005 |

OTHER PUBLICATIONS

European Search Report dated May 19, 2022 for the counterpart European Patent Application No. 212110668.6.

(Continued)

*Primary Examiner* — Andrew W Johns

(57) ABSTRACT

A method determining an angle of a trailer relative to a vehicle. The method includes generating a projection on a trailer with a projector. An image is obtained of the projection on the trailer with a camera. An angle of the trailer relative to a vehicle is determined by comparing the image of the projection with a known pattern of the projection.

28 Claims, 4 Drawing Sheets

(56) References Cited

U.S. PATENT DOCUMENTS

| | | | |
|---|---|---|---|
| 2019/0147609 A1* | 5/2019 | Lohry et al. | G06T 7/60 |
| | | | 382/154 |
| 2021/0027490 A1* | 1/2021 | Taiana et al. | B60D 1/245 |
| 2022/0161619 A1 | 5/2022 | Klinger et al. | |

OTHER PUBLICATIONS

Heckel Werner, "Optische 3D-Konturerfassung und on-line Biegewinkelmessung mit dem Lichtschnittverfahren", https://www.researchgate.net/publication/343961692_Optische_3D-Konturerfassung_und_on-line_Biegewinkelmessung_mit_dem_Lichtschnittverfahren/fulltext/5f49fce8458515a88b839902/Optische-3D-Konturerfassung-und-on-line-Biegewinkelmessung-mit-dem-Lichtschnittverfahren.pdf, Dated: Dec. 1994.

* cited by examiner

METHOD AND DEVICE FOR DETECTING A TRAILER ANGLE

BACKGROUND

The present disclosure relates to detecting a position of a trailer is in relation to a vehicle attached to the trailer. The trailer is attached to the vehicle through a tow hitch point that allows the trailer to pivot around as the vehicle moves. This is especially true when the vehicle is turning while moving forward or in reverse. The tow hitch includes a tow ball, or other form of attachment, that is generally attached to a receiver on a rear of the vehicle.

As a vehicle is reversing, it is possible for the trailer to turn quickly based on steering inputs from a driver of the vehicle. The driver must continually monitor an angle of the trailer about the tow hitch while in reverse to ensure that the trailer is heading towards a desired location and is not rotating to a degree that would result in the trailer contacting a rear portion of the vehicle. One way that the driver can monitor the angle of the trailer is by using the rear view mirrors on the vehicle observe changes in position of the trailer relative to the vehicle.

SUMMARY

In one exemplary embodiment, a method determining an angle of a trailer relative to a vehicle. The method includes generating a projection on a trailer with a projector. An image is obtained of the projection on the trailer with a camera. An angle of the trailer relative to a vehicle is determined by comparing the image of the projection with a known pattern of the projection.

In a further embodiment of any of the above, the image of the projection is compared with a known pattern of the projection by detecting a projected pattern in the image of the projection.

In a further embodiment of any of the above, the image of the projection is compared with a known pattern of the projection by matching the detected pattern with the known pattern of the projection.

In a further embodiment of any of the above, the detected pattern is matched with the known pattern of the projection by matching corresponding pixels from the known pattern of the projection with the image of the projection.

In a further embodiment of any of the above, the known pattern of the projection is based on a calibrated image of the projection at a known trailer angle.

In a further embodiment of any of the above, the image of the projection is compared with the known pattern of the projection by calculating a depth of a trailer front surface based on triangulation.

In a further embodiment of any of the above, the triangulation is based at least in part on a known relative position between the camera and the projector.

In a further embodiment of any of the above, an angle of the trailer is determined by determining an amount of rotation of the trailer about a hitching point based on the depth of the trailer front surface.

In a further embodiment of any of the above, the projector includes a light source and a projector screen for generating the projection.

In a further embodiment of any of the above, the projector screen includes a plurality of geometric shapes.

In a further embodiment of any of the above, the geometric shapes form a grid of geometric shapes.

In a further embodiment of any of the above, the geometric shapes form a plurality of parallel stripes that extend from opposing edges of the projector screen.

In a further embodiment of any of the above, the angle of the trailer relative to the vehicle is measured about a hitching point on the vehicle for attaching the trailer.

In a further embodiment of any of the above, the angle of the trailer relative to the vehicle is zero degrees when a central longitudinal axis of the vehicle through the hitching point aligns with a central longitudinal axis of the trailer running through the hitching point.

In one exemplary embodiment, an assembly for determining an angle of a trailer relative to a vehicle includes a camera for capturing images of the trailer. A projector projects an image on the trailer. A controller is in electrical communication with the camera and the projector and is configured for generating a projection on a trailer with a projector. An image of the projection on the trailer is obtained with a camera. An angle of the trailer relative to a vehicle is determined by comparing the image of the projection with a known pattern of the projection.

In a further embodiment of any of the above, the image of the projection is compared with a known pattern of the projection by detecting a projected pattern in the image of the projection.

In a further embodiment of any of the above, the image of the projection is compared with a known pattern of the projection by matching the detected pattern with the known pattern of the projection.

In a further embodiment of any of the above, the detected pattern is matched with the known pattern of the projection by matching corresponding pixels from the known pattern of the projection with the image of the projection. The known pattern of the projection is based on a calibrated image of the projection at a known trailer angle.

In a further embodiment of any of the above, the image of the projection is compared with the known pattern of the projection by calculating a depth of a trailer front surface based on triangulation.

In a further embodiment of any of the above, the triangulation is based at least in part on a known relative position between the camera and the projector. An angle of the trailer is determined by determining an amount of rotation of the trailer about a hitching point based on the depth of the trailer front surface.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
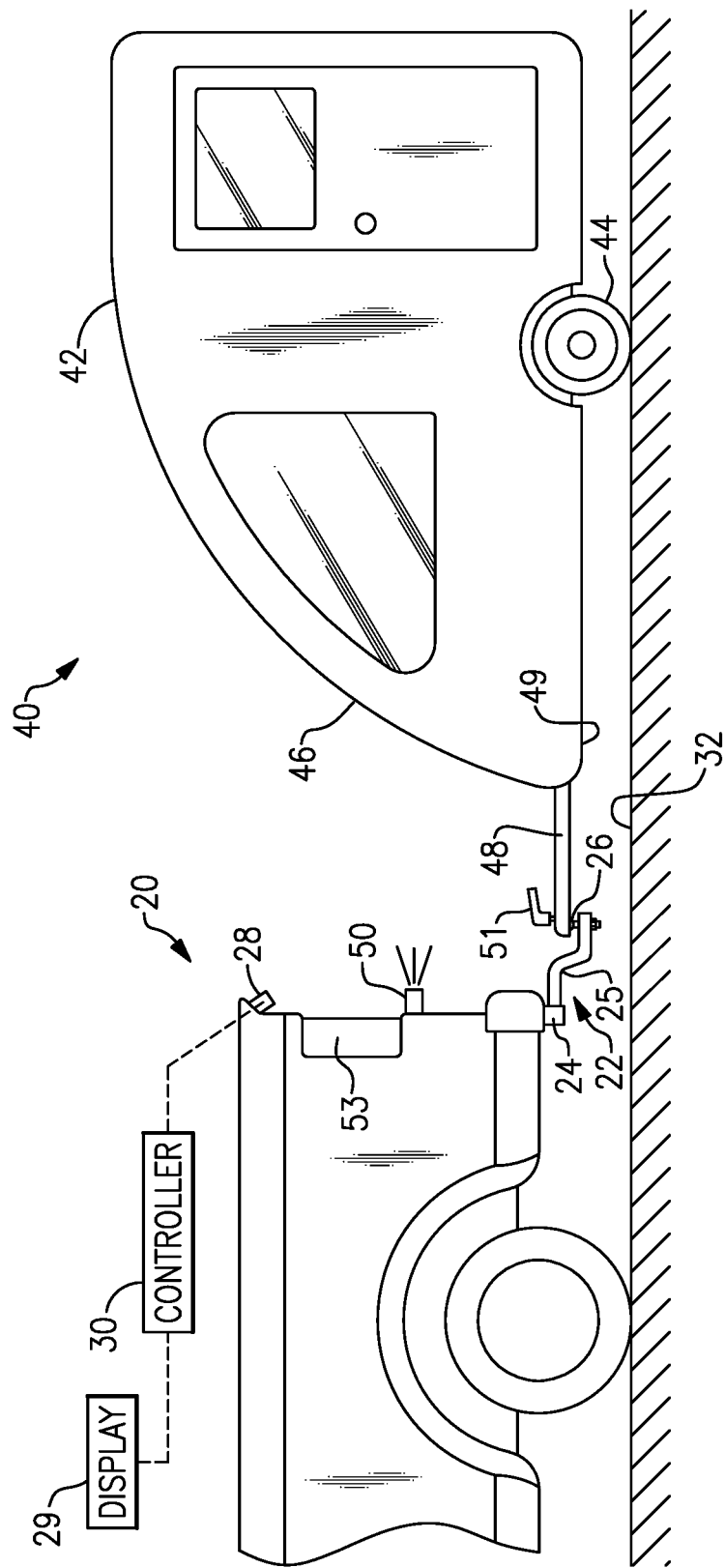
FIG. 1 illustrates an example vehicle attached to a trailer.

It is common today for vehicles 20 to be used in towing a trailer 40 on a ground segment 32. In order to do so, the vehicle much include a tow hitch 22 that is fixed relative to the vehicle 20. In one example, the tow hitch 22 is attached to the vehicle 20 by a receiver 24 fixed to a rear portion of the vehicle 20. In the illustrated example shown in FIG. 1, the tow hitch 22 includes a ball mount 25 for supporting a ball 26 adjacent a first end and attaching to the receiver 24 adjacent a second end. The ball mount 25 is removeable attached to the receiver 24 and may be retained by a pin. The ball 26 on the tow hitch 22 is used to form a connection with a trailer 40 to allow the trailer 40 to rotate around the ball 26 while maneuvering the vehicle 20, particularly when turning or reversing the vehicle 20.

In the illustrated example, the trailer 40 includes a body portion 42 supported by an axle that rotatably supports wheels 44. The body portion 42 can include an enclosure, such as with a recreation vehicle, for occupants or the body portion 42 can include an open cargo carrying platform. In both instances, the body portion 42 would include a front surface 46 that faces the vehicle 20. The front surface 46 extends upward from a base portion 49 of the trailer 40 and could extend upward and in a downstream direction with the flow of air of the trailer 40 such that the surface is not vertical. A tongue 48 extends forward of the body portion 42 to form an attachment with the ball 26 to allow the trailer 40 to pivot about the ball 26 on the vehicle 20. The tongue 48 is fixed to the ball 26 by a latch 51 that includes a handle used to clamp the latch 51 onto the ball 26.

Figure 2:
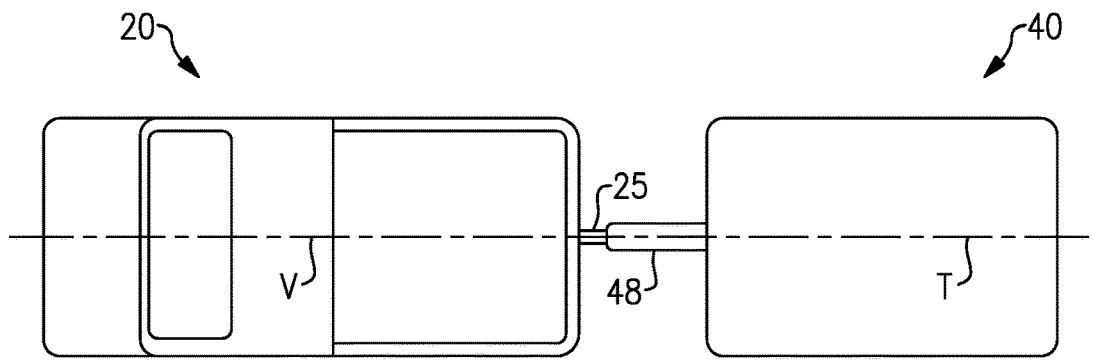
FIG. 2 illustrates an overhead view of the vehicle and trailer of FIG. 1.
Figure 3:
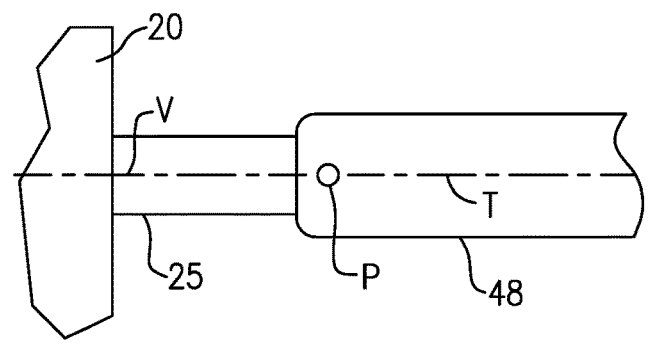
FIG. 3 illustrates an enlarged view of the trailer attached to the vehicle.
Figure 4:
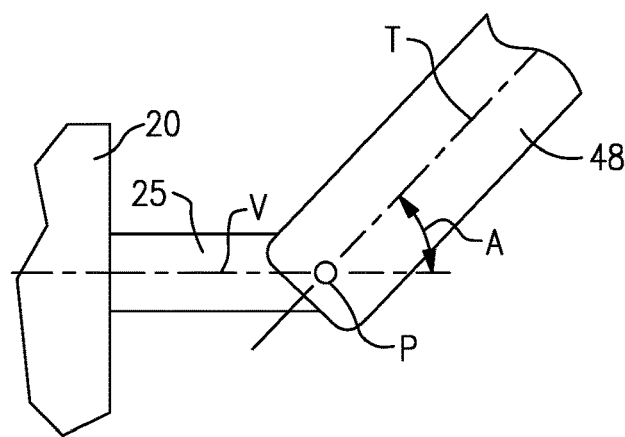
FIG. 4 illustrates another enlarged view of the trailer attached to the vehicle with the trailer angled relative to the vehicle.

FIGS. 2 and 3 illustrate the trailer 40 in alignment with the vehicle 20. In the orientation shown in FIGS. 2 and 3, a central longitudinal axis V of the vehicle 20 extending through the tow ball 26 is aligned in an overlapping configuration with a central longitudinal axis T of the trailer 40 that also extends through the tow ball 26. As shown in FIG. 3, the tongue 48 and the trailer 40 rotate about the pivot point P. The pivot point P corresponds to a central vertical axis through the tow ball 26. As the trailer 40 pivots about the pivot point P, an angle A is generated between the central longitudinal axis V of the vehicle 20 and the central longitudinal axis T of the trailer 40 as shown in FIG. 4. If the angle A becomes too large, the trailer 40 may contact a rear portion of the vehicle 20 or the trailer 40 may no longer move in the desired direction.

In order to determine the angle A of the trailer relative to the vehicle 20, a projector 50 and a camera 28 located on the rear of vehicle 20 are utilized. The projector 50 and the camera 28 are both in electrical communication with a controller 30 (FIG. 5) for directing the projector 50 and the camera 28 to perform the operations outlined below. To direct these components, the controller 30 includes a microprocessor in electrical communication with memory preprogrammed with instructions for performing the steps and operations outlined in this disclosure. The controller 30 can also include further inputs and outputs for communicating with other parts of the vehicle 20, such as a display 29 for providing images to a user of the vehicle 20.

Figure 5:
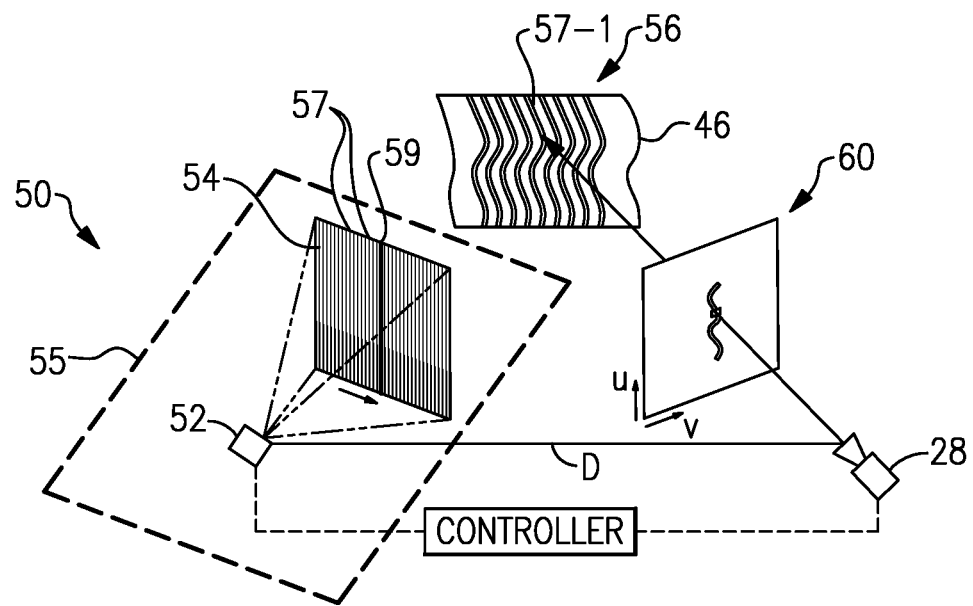
FIG. 5 illustrates an example assembly for determining an angle of the trailer relative to the vehicle.

As shown in FIG. 5, the projector 50 includes a light source 52 and a projector screen 54 for generating a projection 56 on the front surface 46 of the trailer 40. In the illustrated example, the projector screen 54 includes multiple elongated light slits 57 formed by elongated dividers 59 that allow light from the light source 52 to pass through the projector screen 54 and onto the front surface 46 of the trailer 40. The elongated slits 57 are straight on the projector screen 54. However, a corresponding light-slit projection 57-1 can become distorted, such as expanding, contracted, or sloped, on the projection 56 on the front surface 46 of the trailer 40.

Figure 6:
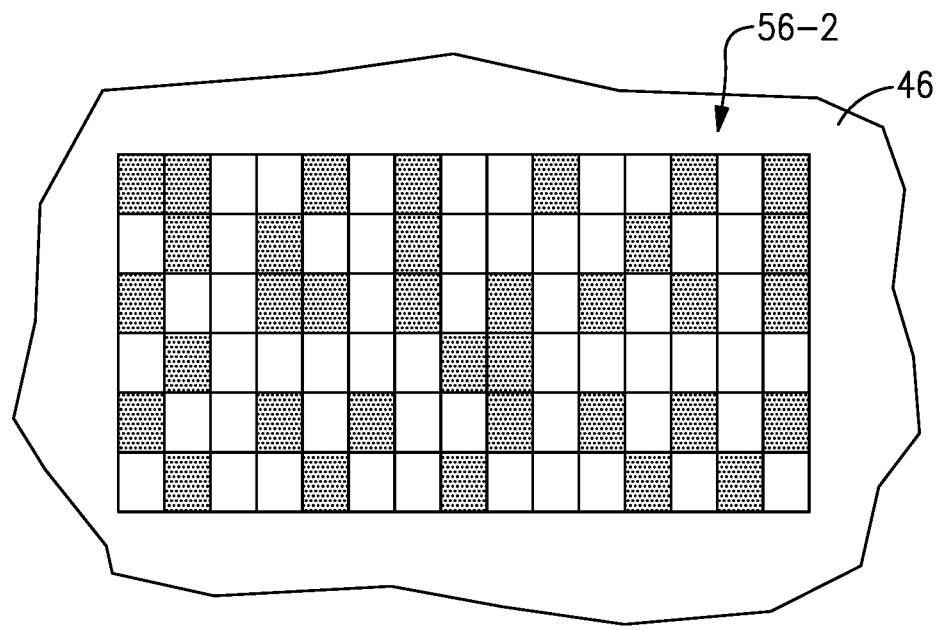
FIG. 6 illustrates an example pattern of a projection.

Additionally, the projector screen 54 can include a single pattern for generating the projection 56 or it can be controlled by the controller 30 to vary the pattern. For example, the projector screen 54 can varying between the elongated light slits 57 as shown in FIG. 5 or a grid pattern for generating a grid projection 56-2 as shown in FIG. 6. Alternatively, the controller 30 can control image appearing on the projector screen 54 and choose patterns besides the elongated slits 57 and the grid such as other geometric shapes.

While the light source 52 and the projector screen 54 can be located in a single housing 55 and attached to the vehicle 20, the light source 52 and projector screen 54 can also be integrated into the vehicle 20. For example, the light source 52 could be integrated into the tail light 53 (FIG. 1) with the projector screen 54 integrated into the tail light lens. Additionally, the light source 52 projecting the light could do so in at least one of a visible spectrum or an infrared spectrum. Projecting light in the visible spectrum is useful in low light environments while projecting light in the infrared spectrum may be useful in higher light environments.

The camera 28 is located on the rear of the vehicle 20 for viewing the trailer 40 and the surrounding environment. The controller 30 is in electrical communication with the camera 28 to control the capturing, storing, and/or processing of the images 60 from the point of view of the camera 28. The camera 28 may be part of a traditional rear-view camera system on the vehicle 20 or a separate camera 28 from the rear-view camera system. The camera 28 includes a lens and an image sensor for capturing images 60 on a pixel-by-pixel basis (See FIG. 5).

FIG. 5 also schematically illustrates one of the images 60 of the front surface 46 of the trailer 40 capturing an image of one of the light stripes 57. The image 60 shown in FIG. 5 includes multiple pixels forming a grid (u,v) with specific pixels that corresponding to the elongated light strips 57 of the projection 56 on the front surface 46 of the trailer 40. However, only a single light slit 57 is shown in the image 60 for simplicity.

The camera 28 can capture the images 60 in the visible or infrared spectrum. Alternatively, two cameras 28 could be used with one capturing the images 60 in the visible spectrum and another capturing images 60 in the infrared spectrum. Furthermore, a relative distance D between the camera or cameras 28 and the projector 50 is known as well as a direction or angle of the field of view of the camera 28 relative to the projector 50.

Figure 7:
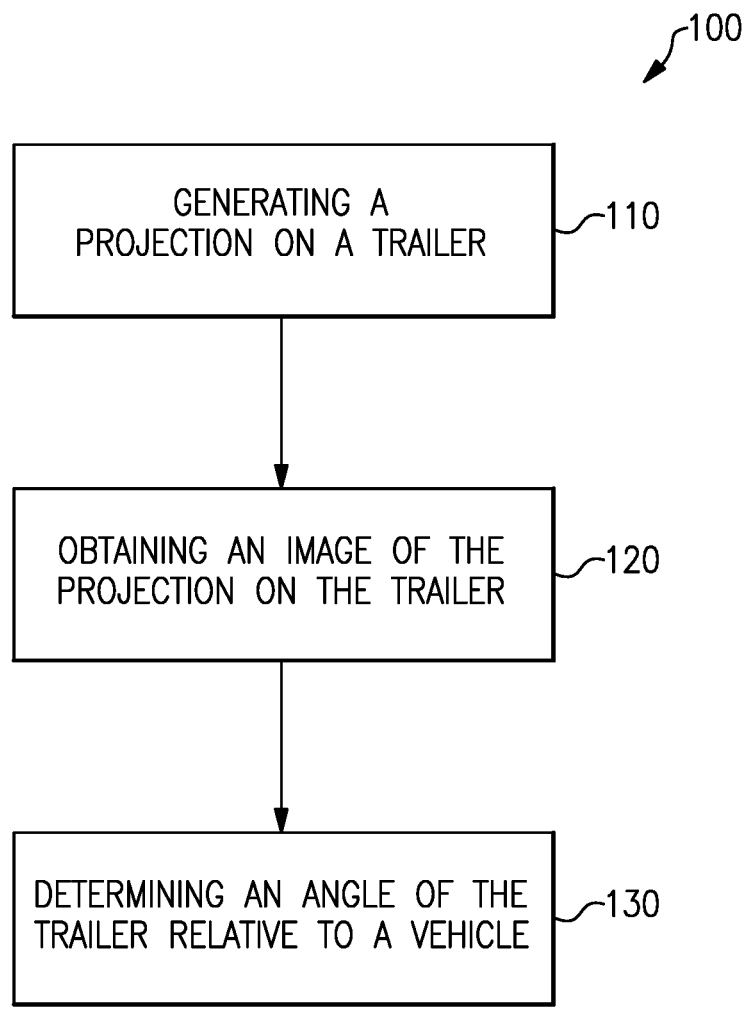
FIG. 7 illustrates an example method of determining an angle of the trailer relative to the vehicle of FIG. 1.

FIG. 7 illustrates a method 100 of determining an angle of the trailer 40 relative to a vehicle 20. The method 100 includes generating the projection 56 on the front surface 46 of the trailer 40 with the projector 50 (Step 110). The projection 56 can include any number of patterns, such as the light-slit projection 57-1 or the grid projection 56-2. In particular, the pattern of the projection 56 may be chosen by the controller 30 based on a profile of the front surface 46 of the trailer 40. For example, the projector screen 54 with the elongated slits 57 may be more recognizable by the camera 28 if the front surface 46 follows a first profile and the grid projection 56-2 may be more recognizable by the camera 28 if the front surface 46 follows a second profile different from the first profile.

Once the projection 56 has been generated on the front surface 46 of the trailer 40, the image 60 of the projection 56 is obtained by the camera 28 and stored by the controller 30 (Step 120). The controller 30 can then process the image 60 to determine an angle A (FIG. 4) of the trailer 40 relative to the vehicle 20 (Step 130). Determining the angle A of the trailer 40 is based comparing the image 60 of the projection 56 with a known pattern of the projection 56.

The known pattern of the projection 56 can be based on a calibrated image of the projection 56 stored on the controller 30 that corresponds to the angle A of the trailer 40 at a predetermined reference orientation. For example, the reference orientation may be when the trailer 40 and the vehicle 20 are positioned such that the vehicle longitudinal axis V and the trailer longitudinal axis T are parallel and aligned through a central of the tow ball 26. This reference orientation would correspond to the angle A being at zero degrees. Additionally, when selecting a reference orientation, the vehicle 20 and the trailer 40 should be on flat ground segment 32, but not necessarily a level ground segment 32.

Comparing the image 60 of the projection 56 with a known pattern of the projection 56 includes detecting a projected pattern in the image 60 of the projection 56. The controller 30 identifies the pattern in the projection 56 by identifying the illuminated portions of projection 56 through the use of an algorithm. The controller 30 can then compare the pattern identified from the projection 56 with the known pattern of the projection. The known pattern of the projection may be the pattern from the projector screen 54 or the calibrated image of the projection discussed above.

When the controller 30 compares the known pattern of the projection 56 with the image 60 of the projection 56, the controller 30 identifies features from the known pattern of the projection 56 with the image 60. For example, the light-slit projections 57-1 in the image 60 are matched on a pixel-by-pixel basis with the known pattern of the projection. The controller 30 can then determine an amount of change between the known patten of the projection with the image 60.

By comparing the image 60 of the projection 56 with the known pattern of the projection on a pixel-by-pixel basis, the angle A of the trailer 40 relative to the vehicle 20 is determined through triangulation. Triangulation is used to determine locations on the front surface 46 because a relative distance D between the camera 28 and the projector 50 is known as well as the relative orientations of the camera 28 and the projection 50. With the relative distance and orientation of the camera 28 and the projector 50, the controller 30 can calculate distances to corresponding features between the projection 56 from the image 60 and the known pattern of the projection. The controller 30 can then use the two distances to calculate a change in position of the camera 28. Determining the change in position of the camera 28 allows the controller 30 to calculate the camera rotation to the corresponding features between the projection 56 from the image 60 and the known pattern of the projection. Because the camera 28 remains fixed relative to the vehicle 20, the difference is position of the corresponding features is used to estimate the angle A of the trailer 40 relative to the vehicle 20.

The ability to determine an angle A of the trailer 40 relative to the vehicle 20 is helpful when positioning the trailer 40 with the use of a trailer assist system. For example, if a desired location of the trailer 40 is selected on the display 29, by knowing the angle A of the trailer 40 relative to the vehicle 20, the controller and prompt a user regarding the appropriate steering angle to input into the vehicle 20 or be used as part of a trailer assist system that provides a steering input angle without input from the user of the vehicle 20.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method determining an angle of a trailer relative to a vehicle, the method comprising:
   generating a projection on a trailer with a projector;
   obtaining an image of the projection on the trailer with a camera mounted in a fixed position to the vehicle at a fixed, spaced distance from the projector; and
   determining an angle of the trailer relative to a vehicle by comparing the image of the projection with a known pattern of the projection,
   wherein the projector comprises a light source and a projector screen, each of the light source and the projector screen disposed at a fixed position along the vehicle, and
   wherein the light source provides light in a human visible spectrum and an infrared spectrum, and the camera comprises two cameras, a first camera for capturing images in the visible spectrum and a second camera for capturing images in the infrared spectrum, and
   wherein determining the angle of the trailer relative to the vehicle compares the known pattern of the projection with at least one of a first image in the visible spectrum captured by the first camera or a second image in the infrared spectrum captured by the second camera.

2. The method of claim 1, wherein comparing the image of the projection with a known pattern of the projection includes detecting a projected pattern in the image of the projection.

3. The method of claim 2, wherein comparing the image of the projection with a known pattern of the projection includes matching the detected pattern with the known pattern of the projection.

4. The method of claim 3, wherein matching the detected pattern with the known pattern of the projection includes matching corresponding pixels from the known pattern of the projection with the image of the projection.

5. The method of claim 3, wherein the known pattern of the projection is based on a calibrated image of the projection at a known trailer angle.

6. The method of claim 1, wherein comparing the image of the projection with the known pattern of the projection includes calculating a depth of a trailer front surface based on triangulation.

7. The method of claim 6, wherein the triangulation is based at least in part on a known relative position between the camera and the projector.

8. The method of claim 7, wherein determining an angle of the trailer includes determining an amount of rotation of the trailer about a hitching point based on the depth of the trailer front surface.

9. The method of claim 1, wherein the projector screen includes a plurality of geometric shapes.

10. The method of claim 9, wherein the geometric shapes form a grid of geometric shapes.

11. The method of claim 9, wherein the geometric shapes form a plurality of parallel stripes that extend from opposing edges of the projector screen.

12. The method of claim 1, wherein the angle of the trailer relative to the vehicle is measured about a hitching point on the vehicle for attaching the trailer.

13. The method of claim 12, wherein the angle of the trailer relative to the vehicle is zero degrees when a central longitudinal axis of the vehicle through the hitching point aligns with a central longitudinal axis of the trailer running through the hitching point.

14. The method of claim 1, wherein the projector screen includes one or more elongated slits which pass light from the light source through the projector screen and onto a front surface of the trailer.

15. The method of claim 1, wherein the light source and the screen are integrated in a tail light of the vehicle, the screen being integrated in a lens of the tail light.

16. An assembly for determining an angle of a trailer relative to a vehicle comprising:
    a camera for capturing images of the trailer, the camera fixed to a rear portion of a vehicle;
    a projector for projecting an image on the trailer, the projector fixed to a rear portion of the vehicle such that the camera and the projector are a fixed distance from each other; and
    a controller in electrical communication with the camera and the projector and configured for:
        generating a projection on a trailer with the projector;
        obtaining an image of the projection on the trailer with a camera; and
        determining an angle of the trailer relative to a vehicle by comparing the image of the projection with a known pattern of the projection,
    wherein the projector comprises a light source and a projector screen disposed at a fixed distance relative to the light source, and
    wherein the light source and the screen are integrated in a tail light of the vehicle, the screen being integrated in a lens of the tail light.

17. The assembly of claim 16, wherein comparing the image of the projection with a known pattern of the projection includes detecting a projected pattern in the image of the projection.

18. The assembly of claim 17, wherein comparing the image of the projection with a known pattern of the projection includes matching the detected pattern with the known pattern of the projection.

19. The assembly of claim 18, wherein matching the detected pattern with the known pattern of the projection includes matching corresponding pixels from the known pattern of the projection with the image of the projection and the known pattern of the projection is based on a calibrated image of the projection at a known trailer angle.

20. The assembly of claim 16, wherein comparing the image of the projection with the known pattern of the projection includes calculating a depth of a trailer front surface based on triangulation.

21. The assembly of claim 20, wherein the triangulation is based at least in part on a known relative position between the camera and the projector and determining an angle of the trailer includes determining an amount of rotation of the trailer about a hitching point based on the depth of the trailer front surface.

22. The assembly of claim 16, wherein the projector screen includes one or more elongated slits which pass light from the light source through the projector screen and onto a front surface of the trailer.

23. An assembly for determining an angle of a trailer relative to a vehicle comprising:
    a camera for capturing images of the trailer, the camera fixed to a rear portion of a vehicle;
    a projector for projecting an image on the trailer, the projector fixed to a rear portion of the vehicle such that the camera and the projector are a fixed distance from each other; and
    a controller in electrical communication with the camera and the projector and configured for:
        generating a projection on a trailer with the projector;
        obtaining an image of the projection on the trailer with a camera; and
        determining an angle of the trailer relative to a vehicle by comparing the image of the projection with a known pattern of the projection,
    wherein the projector comprises a light source and a projector screen disposed at a fixed distance relative to the light source,
    wherein the light source provides light in a human visible spectrum and an infrared spectrum, and the camera comprises two cameras, a first camera for capturing images in the visible spectrum and a second camera for capturing images in the infrared spectrum, and
    wherein determining the angle of the trailer relative to the vehicle compares the known pattern of the projection with at least one of a first image in the visible spectrum captured by the first camera or a second image in the infrared spectrum captured by the second camera.

24. An assembly for determining an angle of a trailer relative to a vehicle comprising:
    a camera for capturing images of the trailer;
    a projector for projecting an image on the trailer; and
    a controller in electrical communication with the camera and the projector and configured for:
        generating a projection on a trailer with a projector;
        obtaining an image of the projection on the trailer with a camera; and
        determining an angle of the trailer relative to a vehicle by comparing the image of the projection with a known pattern of the projection,
    wherein a pattern of the projection is selected by the controller.

25. The assembly of claim 24, wherein the pattern of the projection is selected by the controller based upon a front surface profile of the trailer.

26. The assembly of claim 24, wherein the projector comprises a light source and a projector screen disposed relative to the light source, the screen having a plurality of patterns and the controller varies the pattern which generates the projection.

27. The assembly of claim 24, wherein the projector comprises a light source and a projector screen disposed relative to the light source, the light source and the screen are integrated in a tail light of the vehicle, the screen being integrated in a lens of the tail light.

28. The assembly of claim 24, wherein the projector provides light in a human visible spectrum and an infrared spectrum, and the camera comprises two cameras, a first camera for capturing images in the visible spectrum and a second camera for capturing images in the infrared spectrum, and determining the angle of the trailer relative to the vehicle compares the known pattern of the projection with at least one of a first image in the visible spectrum captured by the first camera or a second image in the infrared spectrum captured by the second camera.

* * * * *